UNITED STATES PATENT OFFICE.

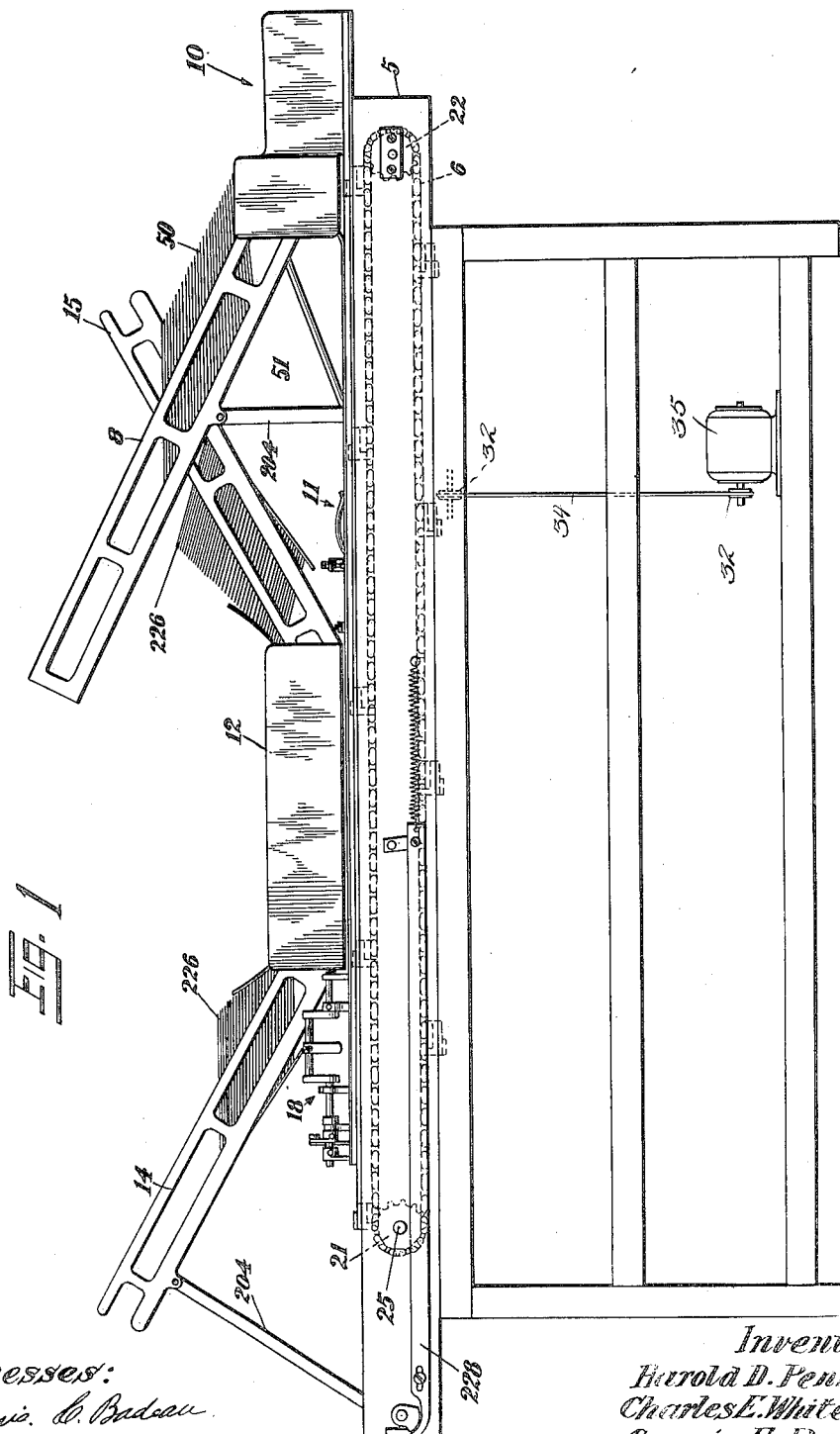

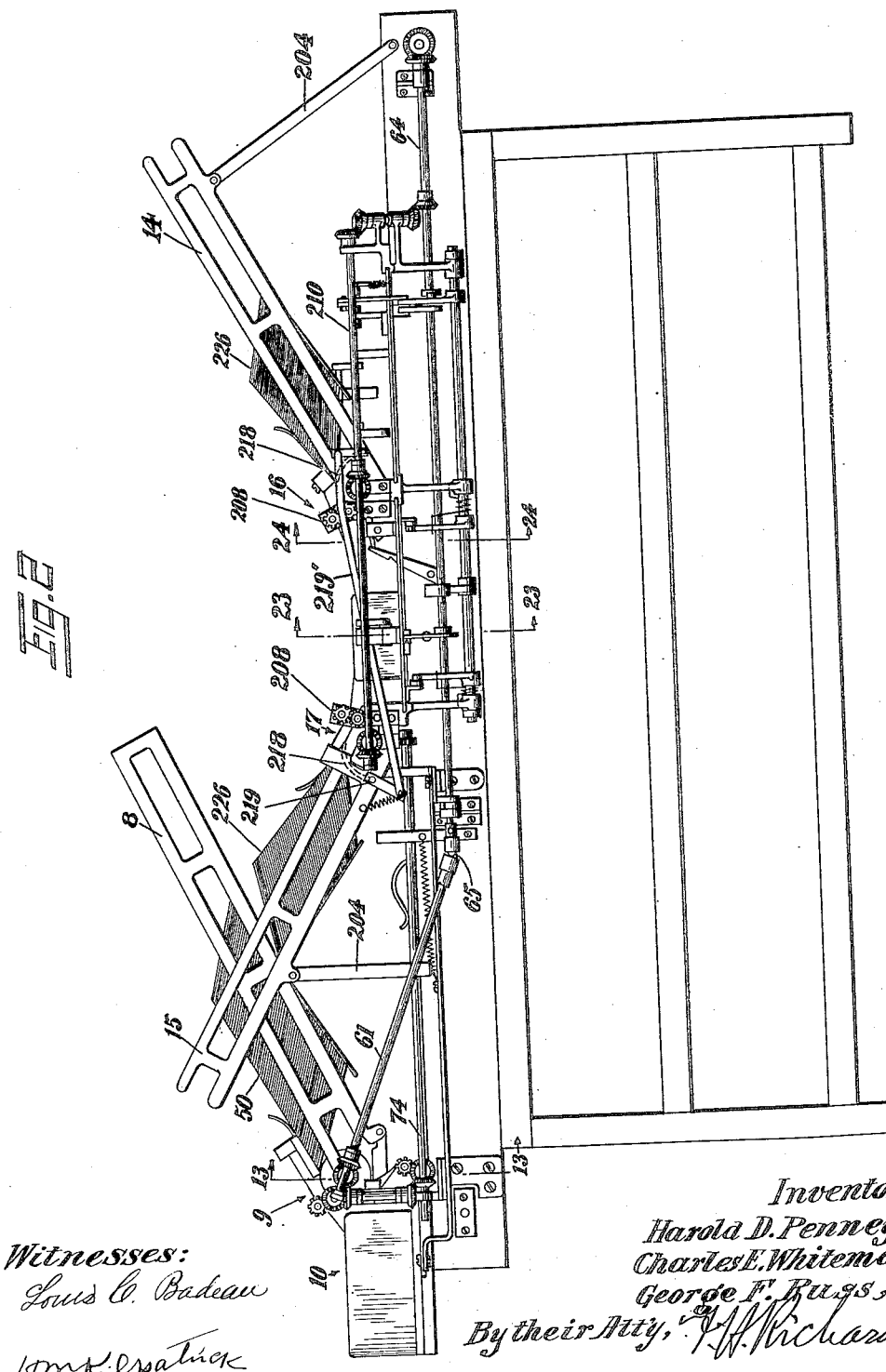

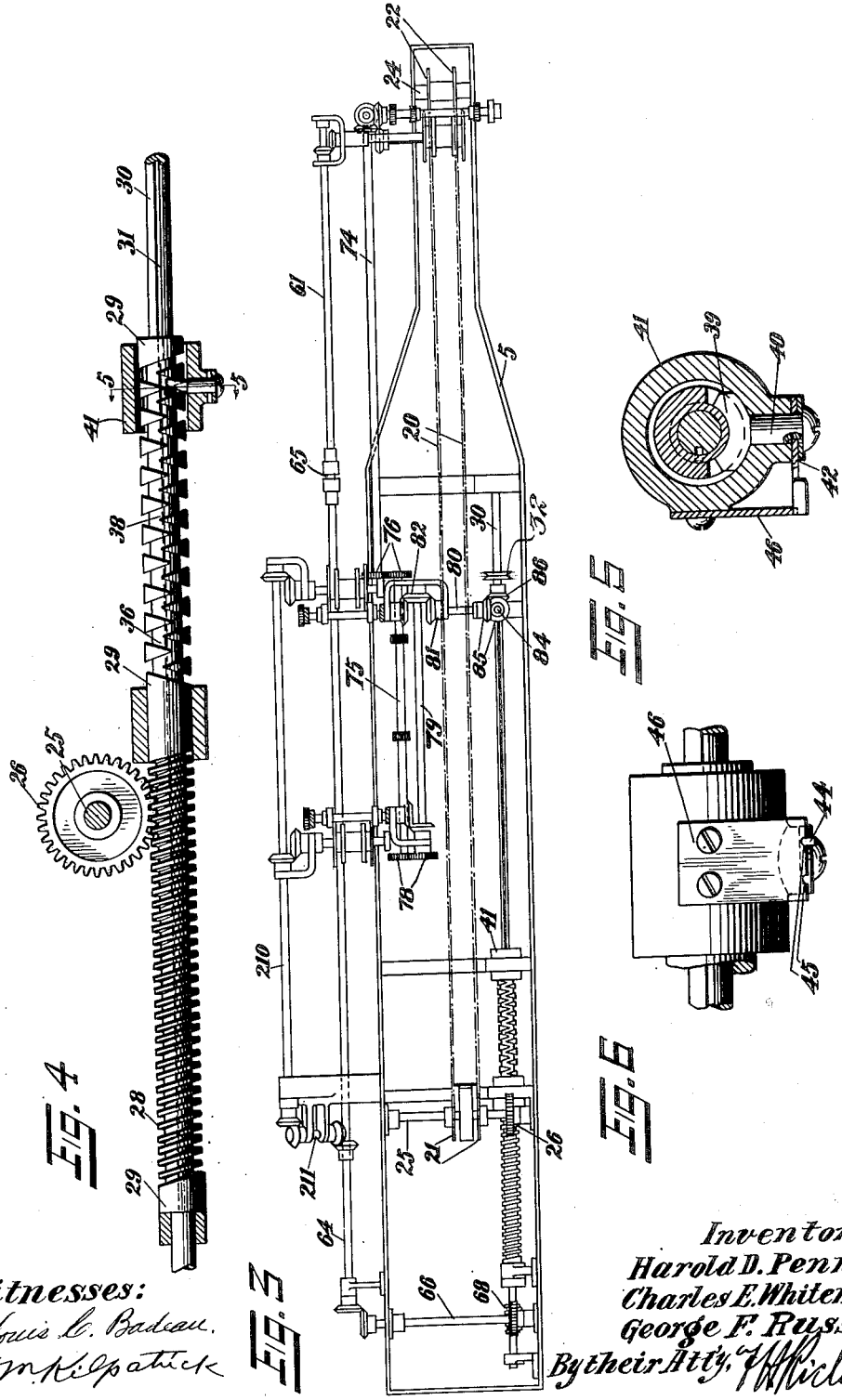

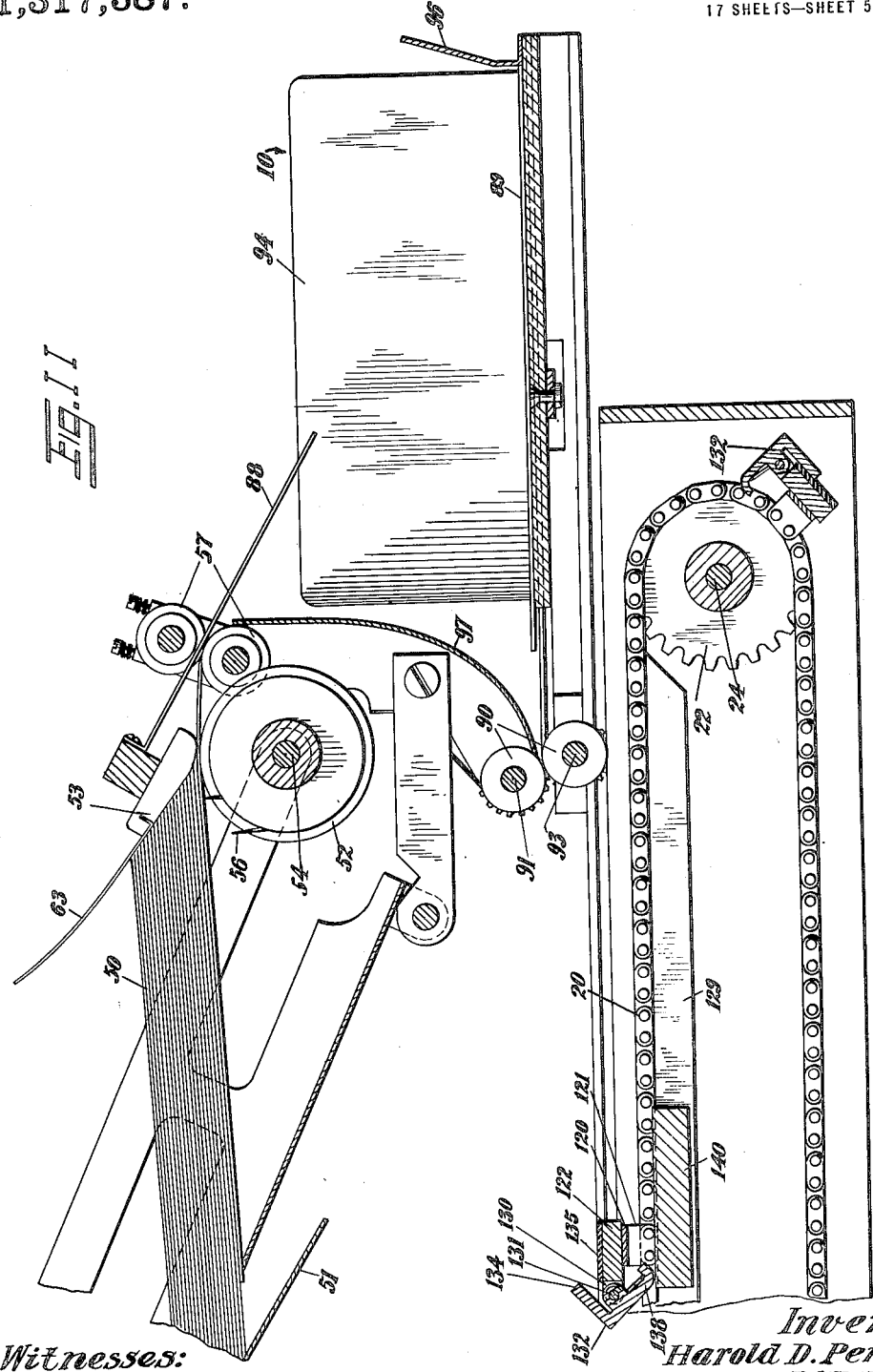

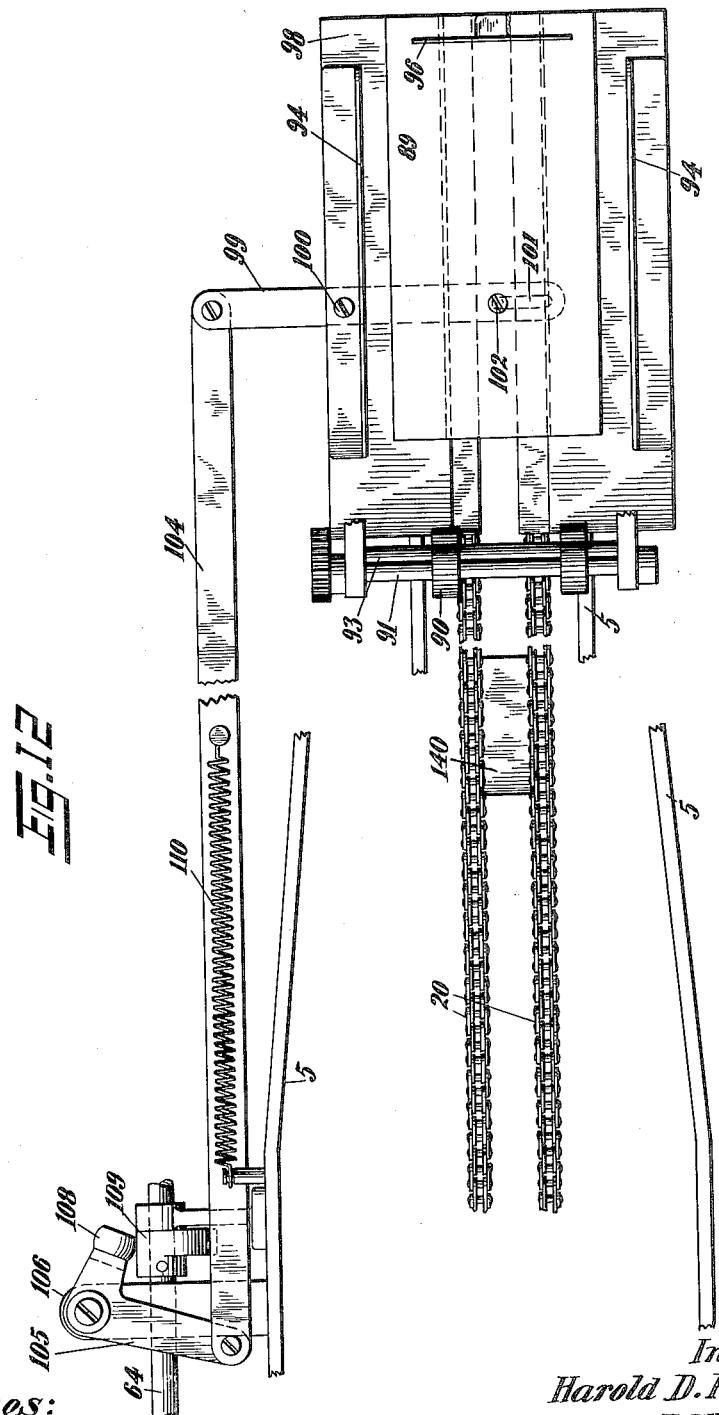

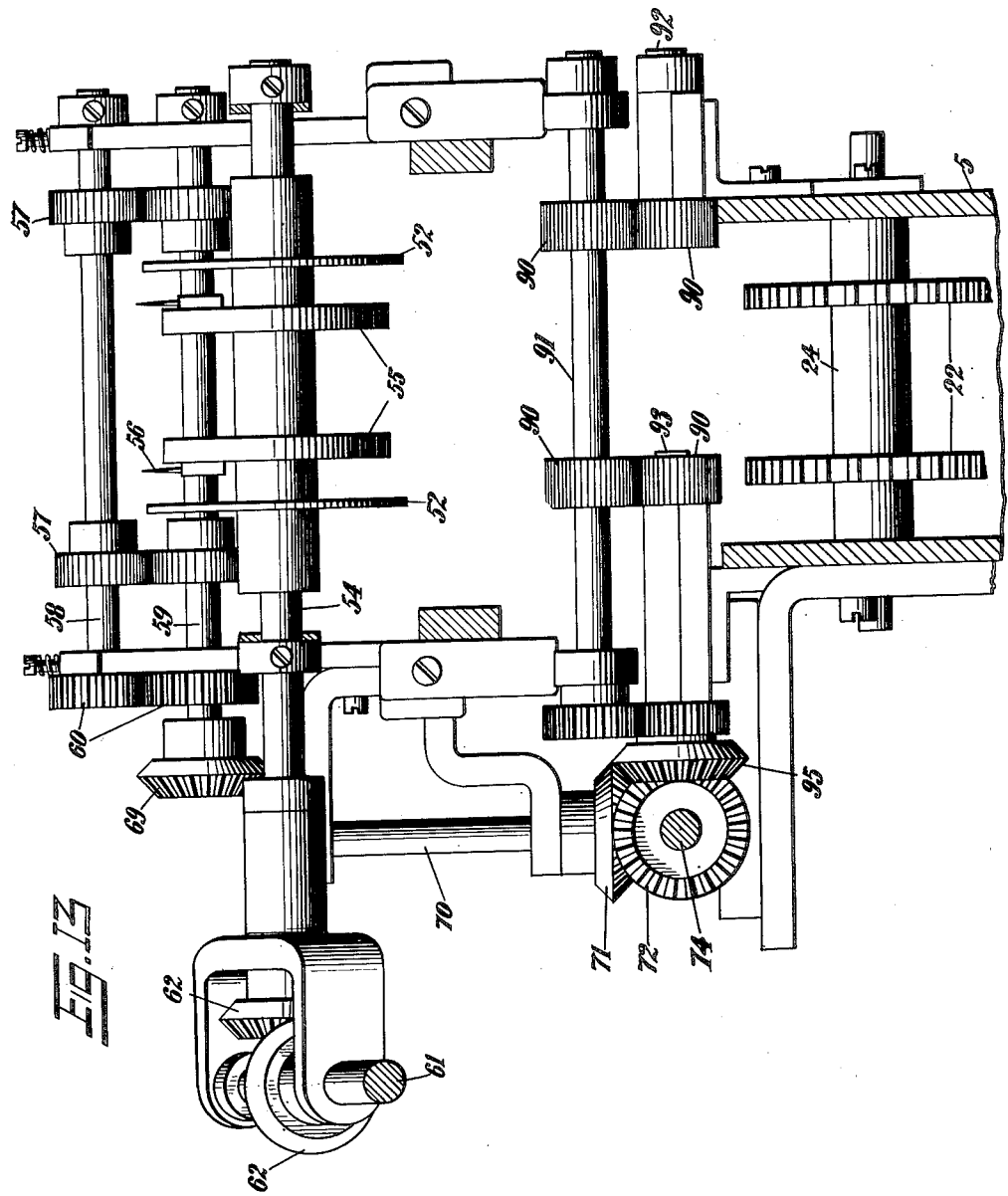

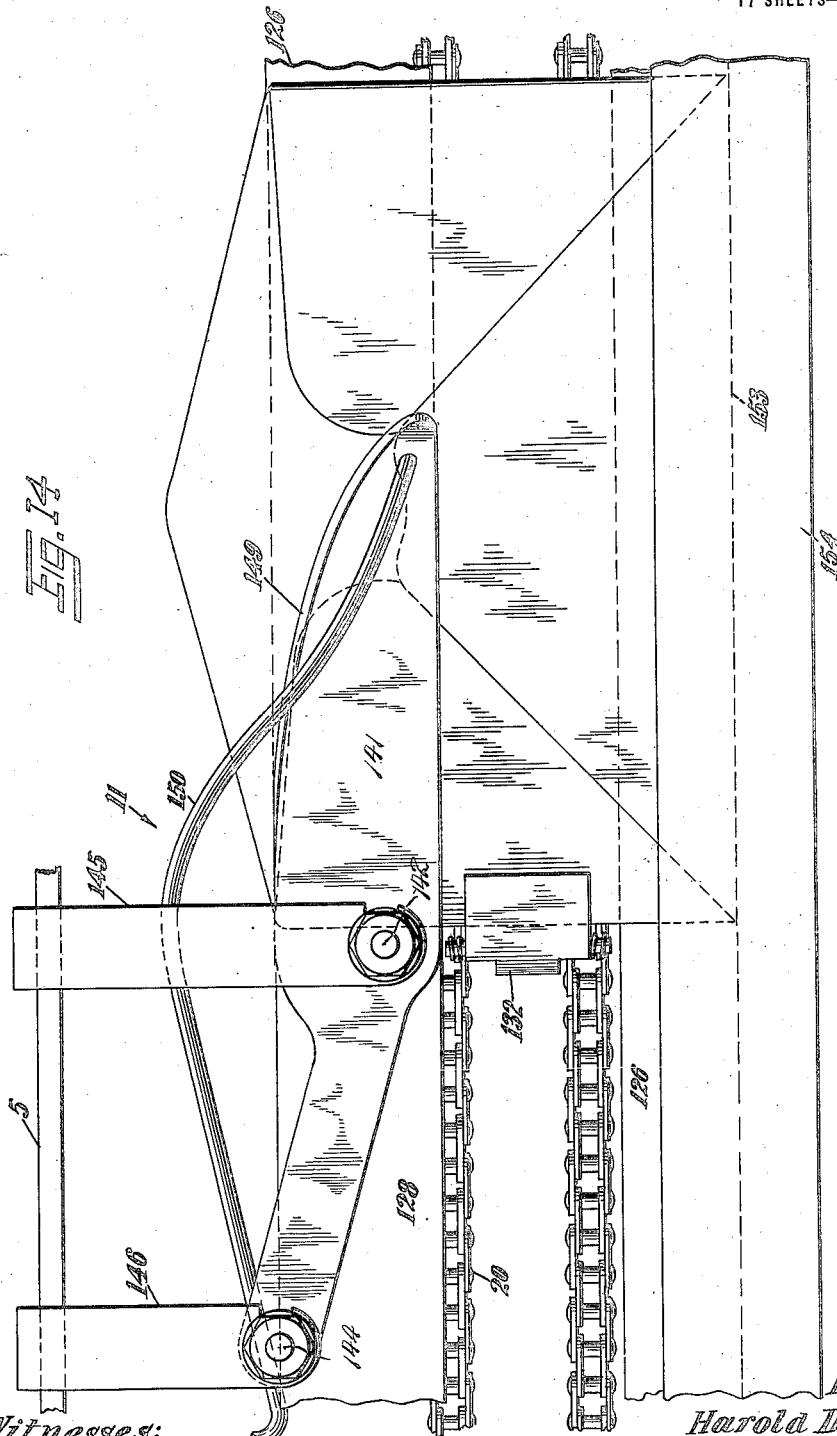

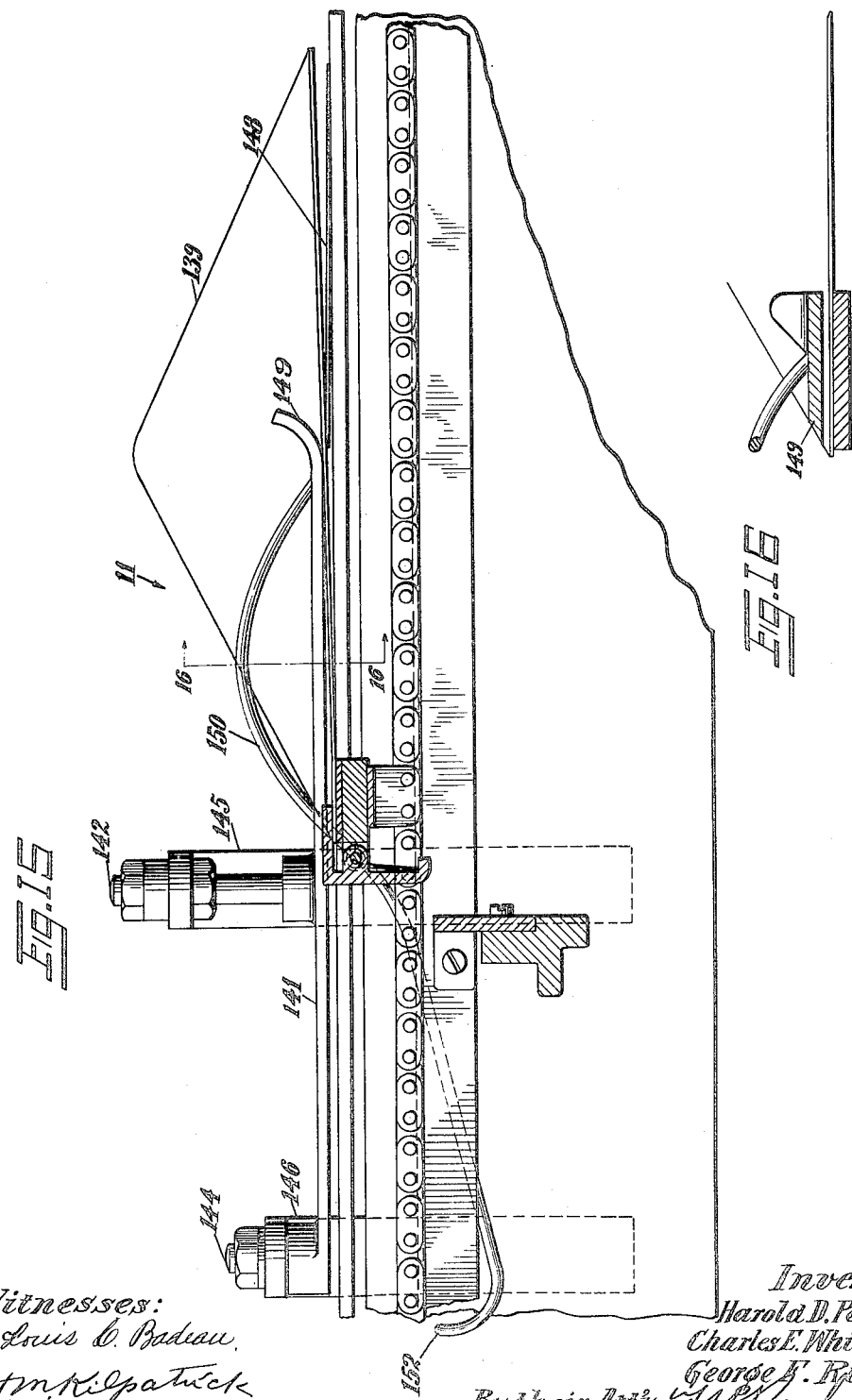

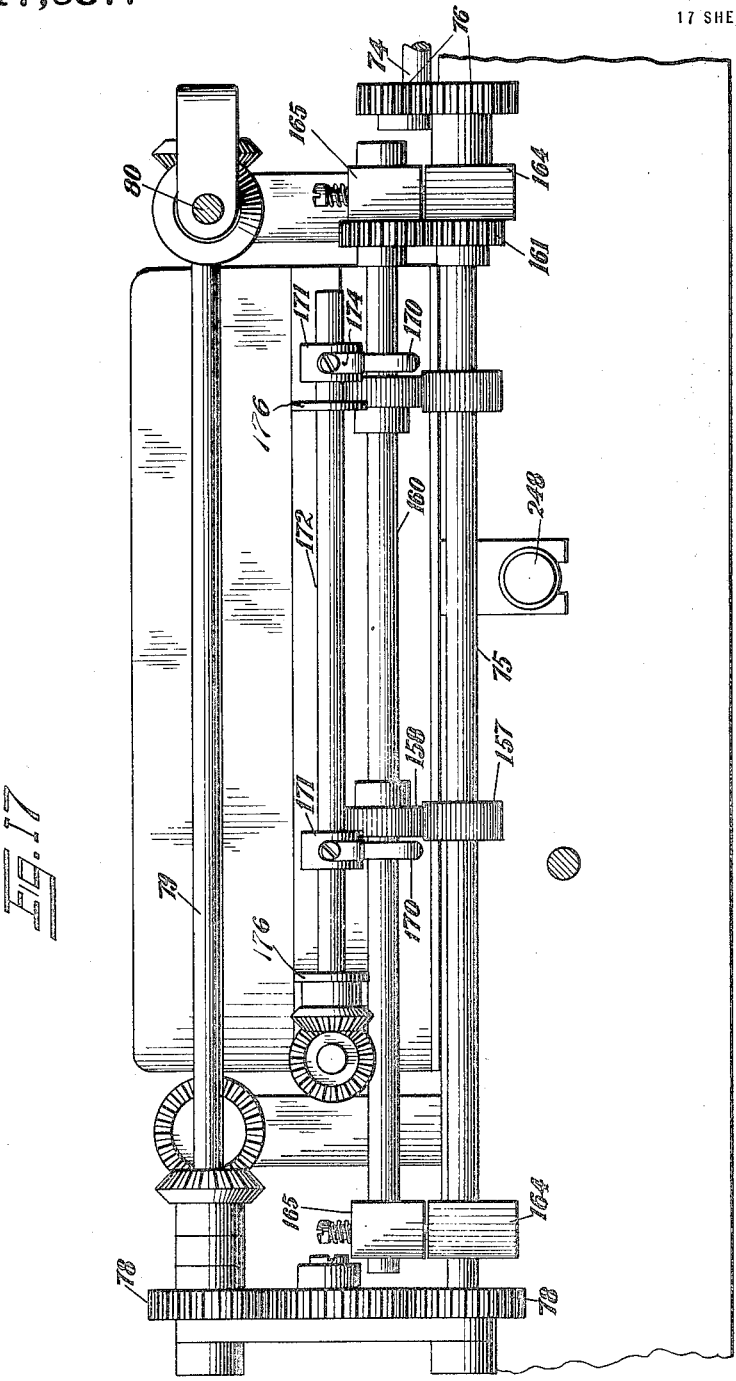

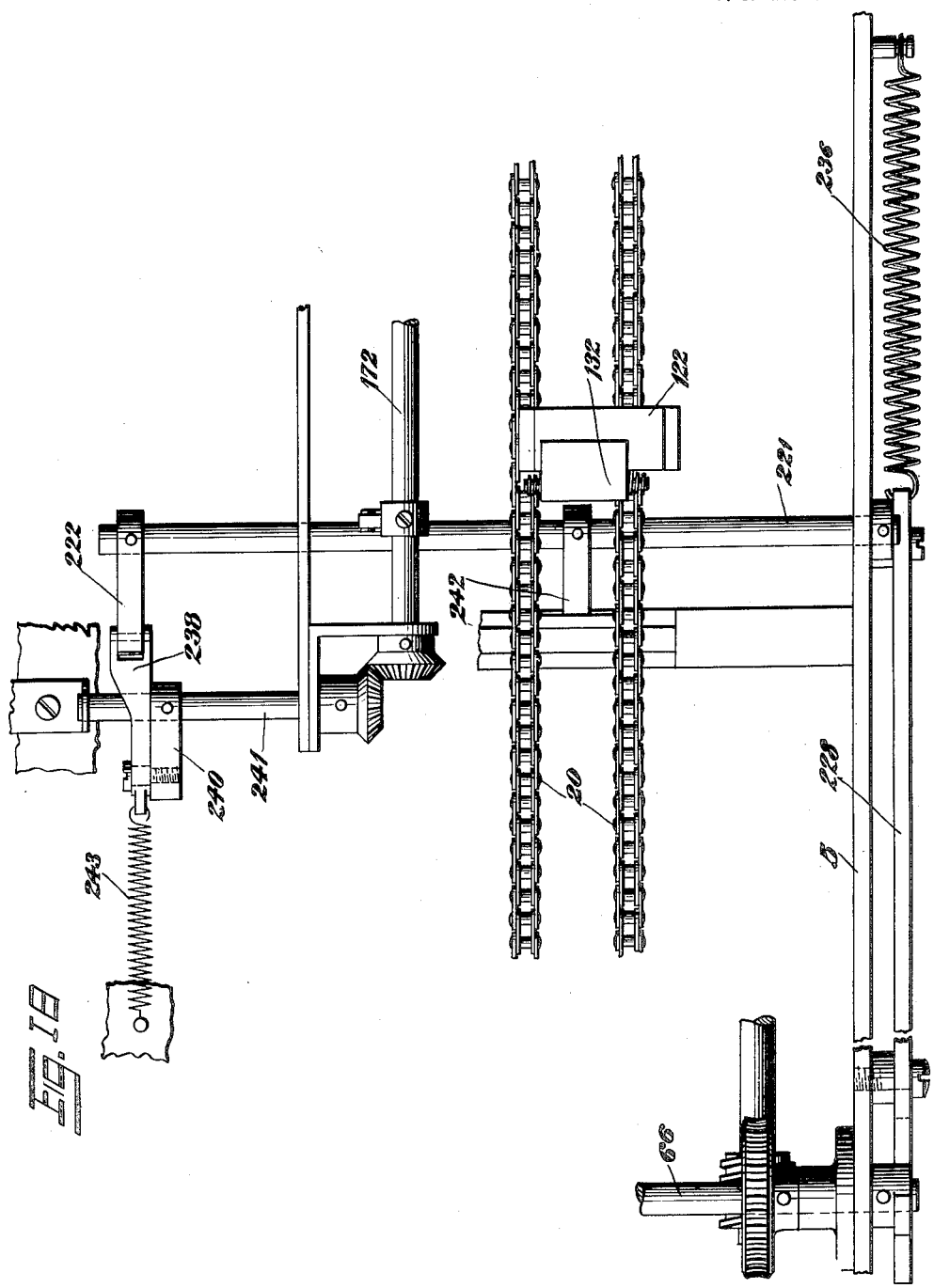

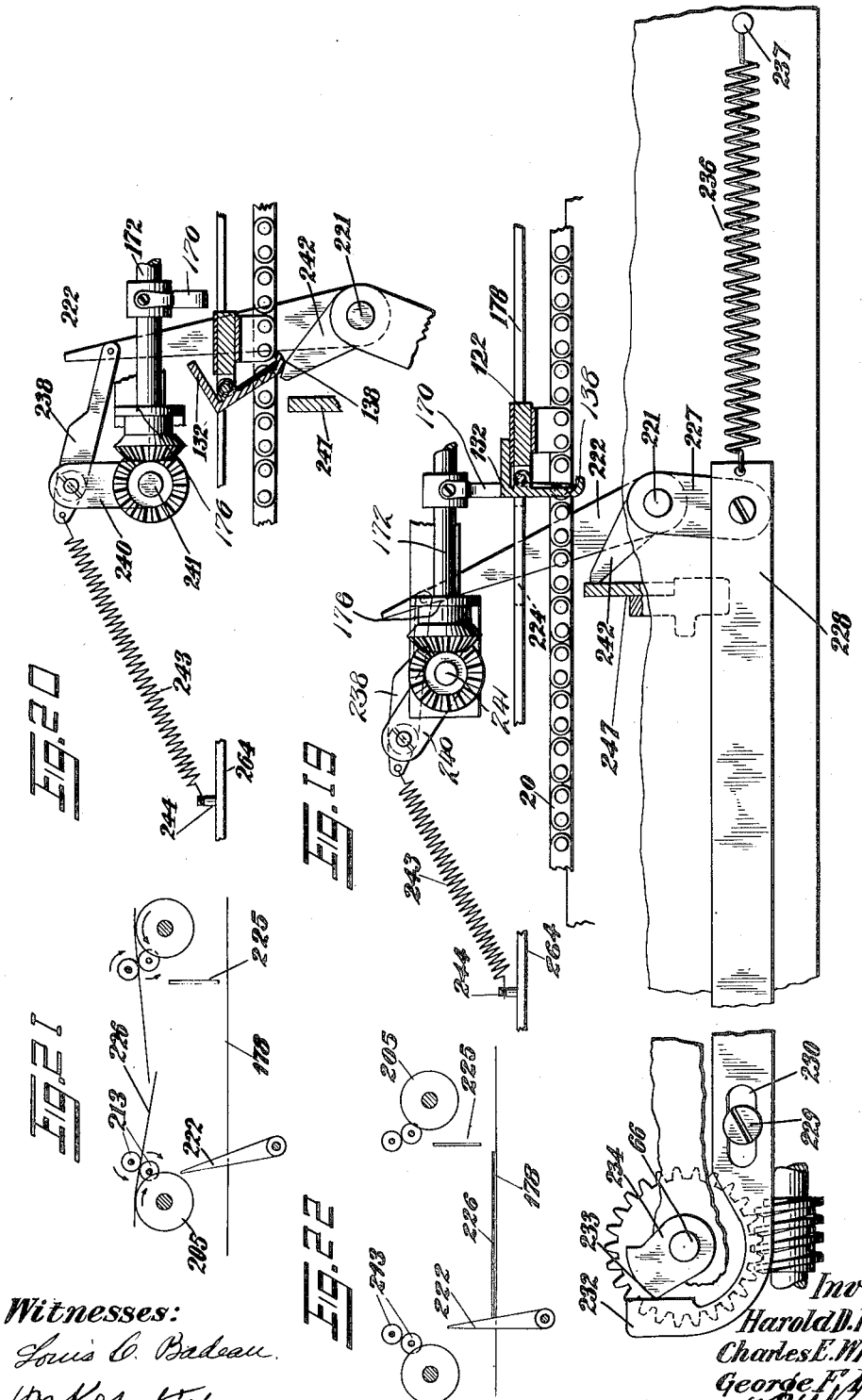

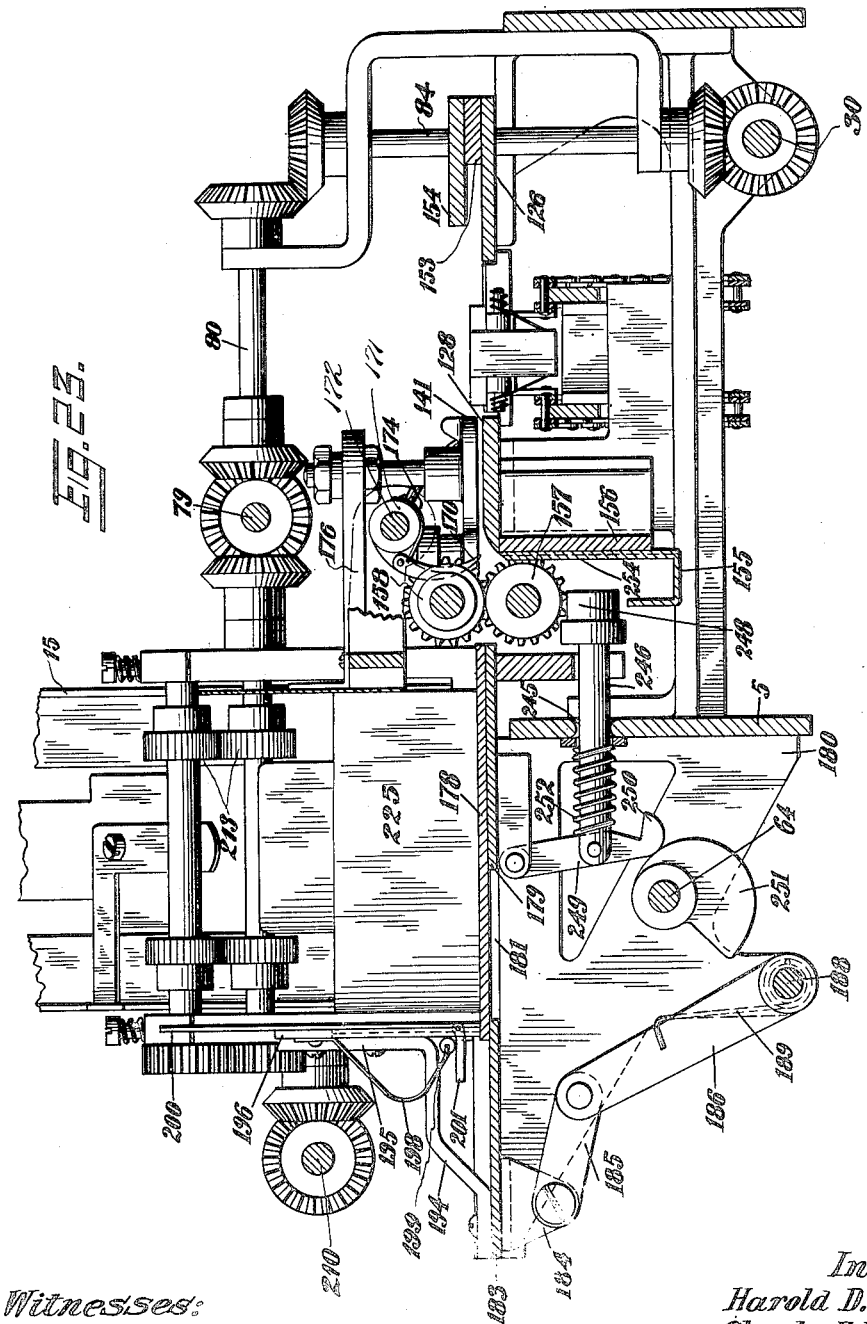

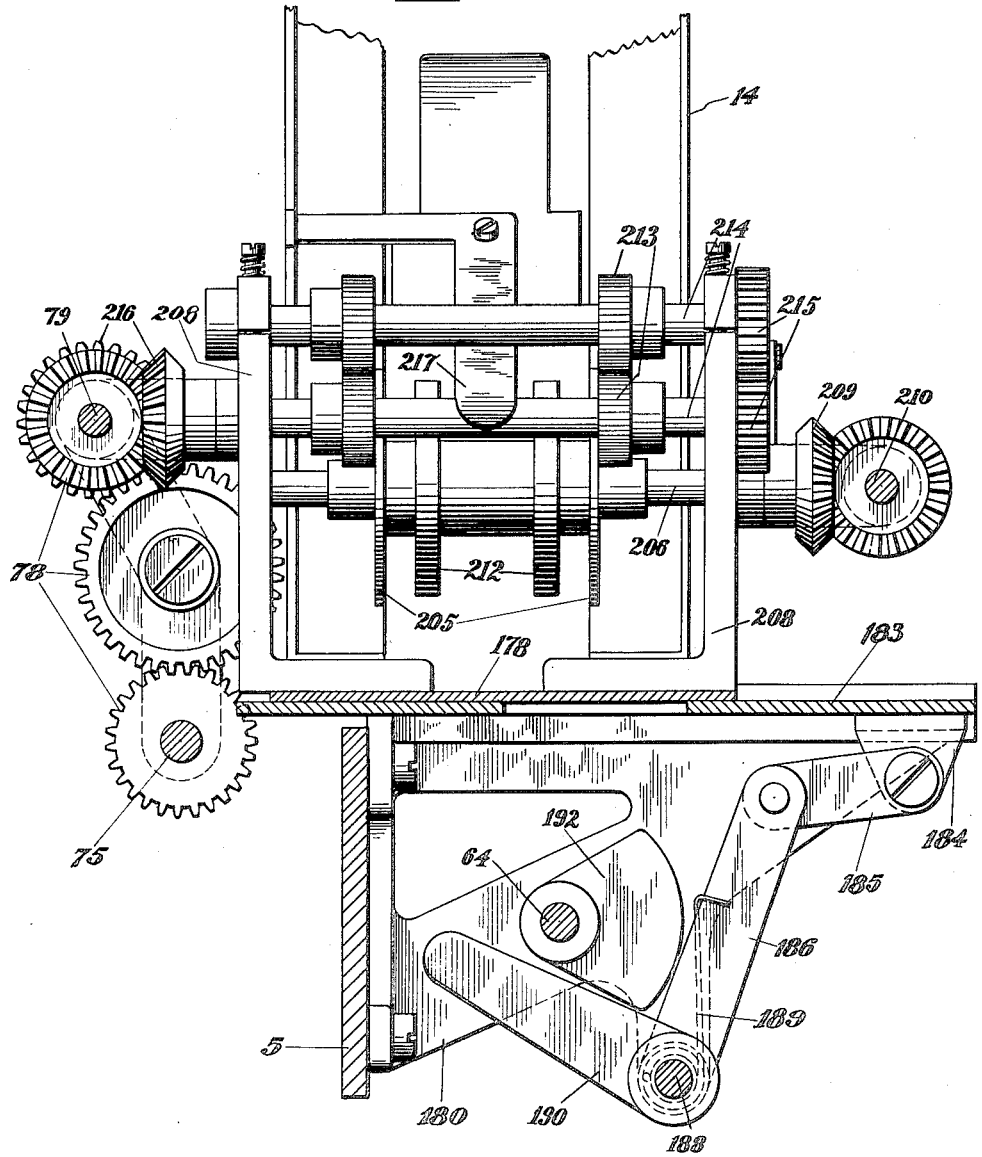

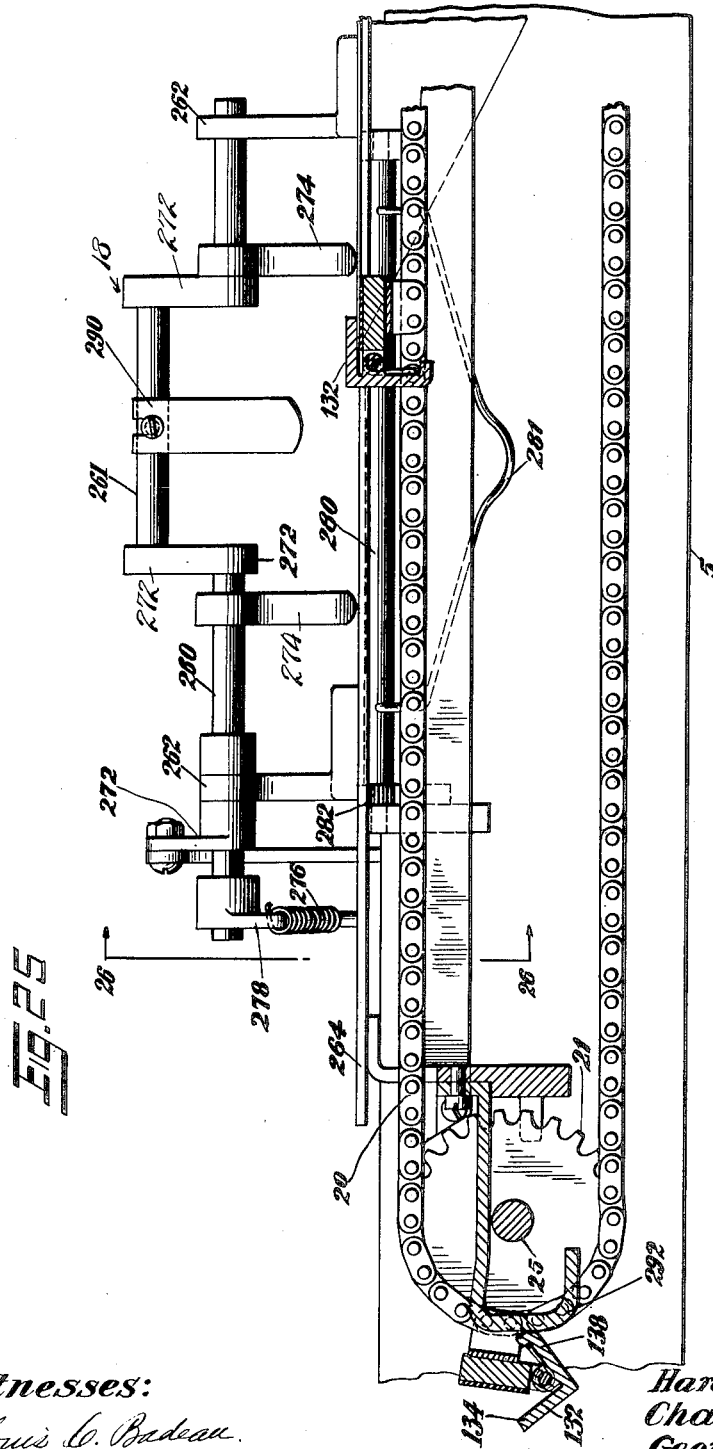

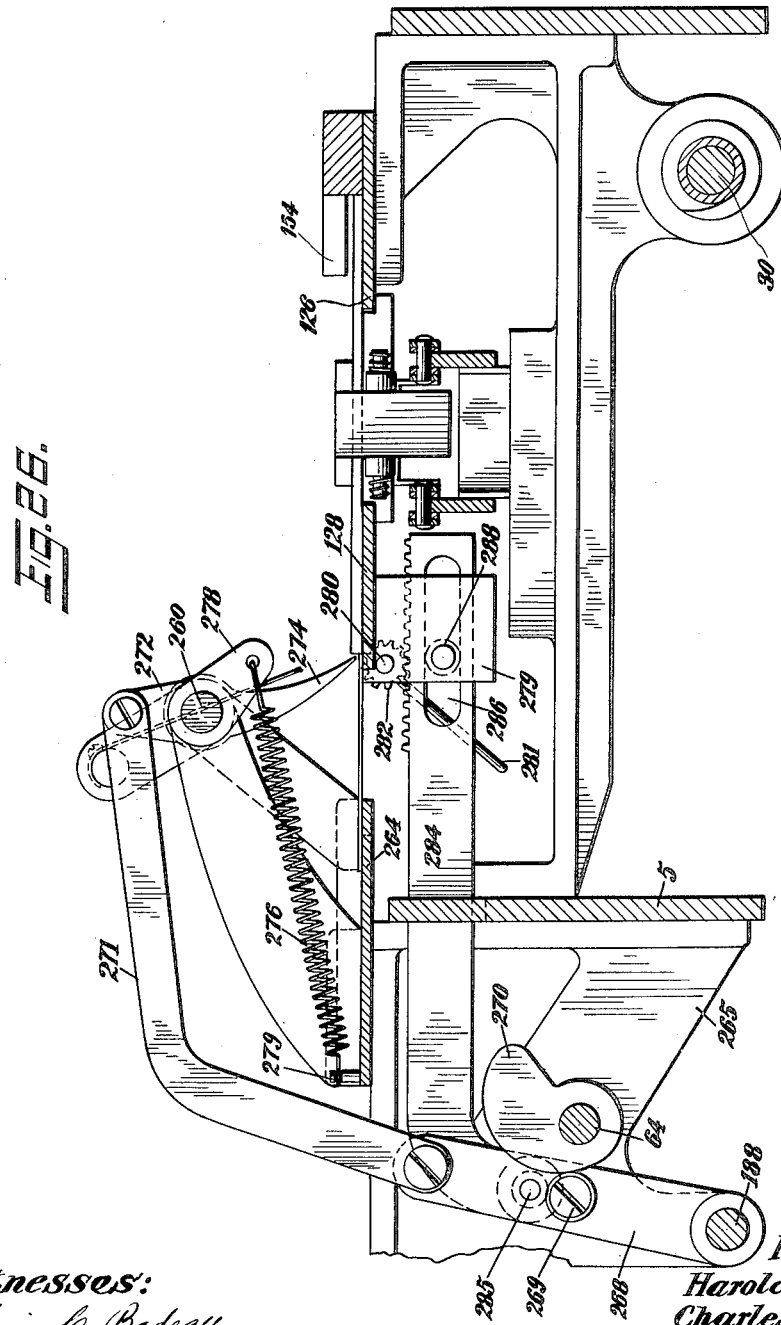

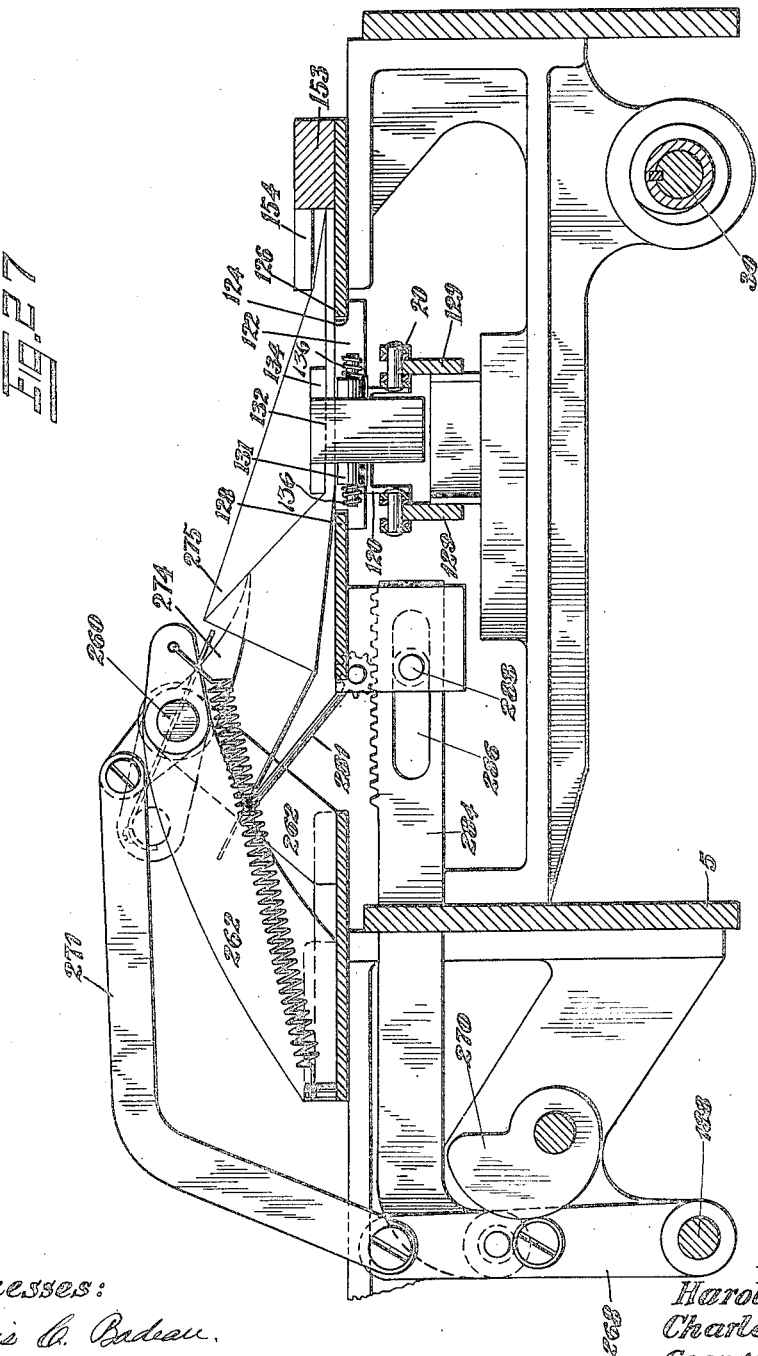

HAROLD D. PENNEY, OF PELHAM, AND CHARLES E. WHITEMAN, OF RICHMOND HILL, NEW YORK, AND GEORGE F. RUSS, OF JERSEY CITY, NEW JERSEY, ASSIGNORS TO AUTOMATIC INSERTING MACHINE CORPORATION, OF NEW YORK, N. Y., A CORPORATION OF NEW YORK.

ENVELOP FILLING AND CLOSING MACHINE.

1,317,387.                  Specification of Letters Patent.      Patented Sept. 30, 1919.

Application filed November 14, 1917. Serial No. 201,950.

*To all whom it may concern:*

Be it known that we, HAROLD D. PENNEY, a citizen of the United States, residing in Pelham, in the county of Westchester and State of New York, CHARLES E. WHITEMAN, a citizen of the United States, residing in Richmond Hill, in the county of Queens and State of New York, and GEORGE F. RUSS, a citizen of the United States, residing in Jersey City, in the county of Hudson and State of New Jersey, have invented certain new and useful Improvements in Envelop Filling and Closing Machines, of which the following is a specification.

This invention relates to machines for filling and closing envelops, and has for its object to improve generally the construction of such machines and increase their capabilities.

A particular object of the invention is to improve generally the machine described in United States Patent No. 1,122,519, to C. L. Lovercheck, issued Dec. 29, 1914.

Other objects of the invention are to provide means for inserting a plurality of circulars or the like into each envelop, to provide means for holding open the envelops for such insertions; to provide improved feeding means for feeding the circulars or the like to the envelops; to provide means for tucking in the flaps of the envelops after the circulars or the like have been inserted; to provide an improved traveling chain construction for conveying the envelops from one set of manipulating devices to another, and an improved means for imparting intermittent movement to such chain.

These and still other objects will appear as the description proceeds.

The machine embodying my invention comprises besides other mechanisms, mechanism for holding back the flap of the envelop, mechanism for inserting the circulars into the envelops, and mechanism for tucking the flaps in after the circulars have been inserted. An endless conveyer chain is provided with means for clamping the envelops therein for presenting the envelops to the above mechanisms, and in order to give the inserting and tucking mechanisms time to act upon the envelops, we have provided a novel worm drive for imparting intermittent travel to the chain. Suitable feeding means are provided for feeding circulars of various thickness to the inserting mechanism and envelops of various thickness to the chain.

While herein, we have described minute details of our invention, the invention is not limited to these, since various changes may be made in the construction and combination of the parts without departing from the spirit and scope of the invention as claimed.

In the accompanying drawings, showing by way of example, one of many possible embodiments of our invention:

Figure 1 is a front elevation of the machine;

Fig. 2 is a rear elevation;

Fig. 3 is a diagrammatic plan view showing the arrangement of the various drive shafts of the machine;

Fig. 4 is a side elevation of the intermittent worm drive and the reversing screw for causing the worm to reciprocate upon the shaft that drives it;

Fig. 5 is a sectional view taken on the line 5—5 of Fig. 4, showing the housing for the shoe that engages the grooves of and reciprocates the reversing screw;

Fig. 6 is a rear elevation of the shoe housing;

Fig. 11 is a central vertical sectional view, partly in elevation of the envelop feeding and timing mechanism for feeding envelops to the conveyer chain;

Fig. 12 is a fragmental plan of the envelop timing mechanism;

Fig. 13 is a partial sectional view of the envelop feeding mechanism, taken approximately on the line 13—13 of Fig. 2;

Fig. 14 is a plan of the helical flap opening device which opens and folds back the flaps as the envelops are carried past by the conveyer chain;

Fig. 15 is a partial fragmental sectional view showing a front elevation of the flap opening device;

Fig. 16 shows a section on the line 16—16 of Fig. 15.

Fig. 17 is a front elevation of the inserting rolls and the mechanism for opening the mouths of the envelops as the circulars are inserted.

Fig. 18 is a fragmental plan of the mechanism for unclamping the envelops and evening the circulars before the latter are fed into the envelops;

Fig. 19 is a fragmental front elevation, partly in section showing one phase of the operation of the unclamping and evening mechanisms;

Fig. 20 is a similar view showing another operating phase of these mechanisms;

Fig. 21 is a diagrammatic front view showing a step in the operation of the timing of the circular feeding rolls of the circular feeding mechanism;

Fig. 22 is another step in such operation.

Fig. 23 is a transverse sectional view of the machine, taken approximately on the line 23—23 of Fig. 2, and showing a circular feeding and inserting mechanism;

Fig. 24 is a fragmental sectional view taken approximately on the line 24—24 of Fig. 2, showing the feeding and timing means for the circulars;

Fig. 25 is a fragmental front elevation showing the means for tucking in the flaps and for releasing and discharging the envelops.

Fig. 26 is a sectional view taken on the line 26—26 of Fig. 25; and

Fig. 27 is a view similar to Fig. 26, but showing the parts in a different position.

Figure 7:
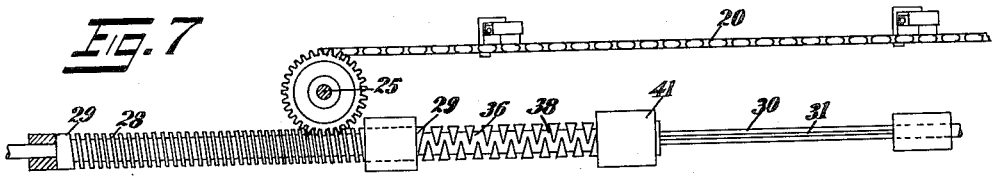
Figs. 7 to 10 are diagrammatic side elevations showing different phases of the operation of the worm drive.

On the main frame 5 of the machine are supported the chain conveyer 6; the envelop magazine 8; the envelop feeding and timing mechanisms 9 and 10 (Figs. 2 and 11), which feed envelops to the chain conveyer; the flap opening device 11 (Figs. 1, 14, 15, and 16); the envelop opening and circular inserting mechanisms (Figs. 17 to 24), disposed behind the protecting cover 12 (Fig. 1); the circular magazines 14 and 15; the circular feeding and timing devices 16 and 17 (Fig. 2); and the flap tucking mechanism 18.

The feeding and timing mechanisms 9, 16 and 17 are claimed in the co-pending application of Penney and Russ, filed March 5, 1918, Serial No. 220,421, for sheet feeding mechanisms.

The envelops from the magazine 8 are, by means of the feeding mechanism 9 and the timing mechanism, fed to the chain conveyer by which they are carried past the flap opening device and stopped in front of the envelop opening and circular inserting mechanisms, when the circulars fed to such mechanisms are inserted into the envelop. Thence the envelop moves and is again stopped before the flap tucking mechanism where the flap is tucked in, after which the envelop is discharged.

The chain conveyer 6 is given an intermittent movement in order that it may be at rest when envelops are fed thereto from the timer 10 and when the envelops are stopped in front of the opening and inserting mechanism and the flap tucking mechanism. Means for supporting the chain conveyer 6 and imparting this intermittent movement will now be described.

The chain conveyer 6 comprises a pair of chains 20 (Figs. 3 and 12), carried at opposite ends on sprocket wheels 21 and 22 in turn rotatably mounted on sprocket shafts 24 and 25 (Fig. 3). The sprocket wheels 21 are fixedly mounted on said shaft 25, as is also the worm wheel 26 meshing with the worm threads 28 of the sleeve 29 having sliding movement on the main drive shaft 30 but constrained to rotate therewith by means of a suitable key fixed to the sleeve and engaging in a keyway 31 on said shaft.

The shaft 30 is suitably driven, as by means of wheels 32 and belt 34 from the motor 35.

The sleeve 29 is provided with a pair of intersecting spiral grooves 36 and 38 of equal opposite pitch, the pitch of one of the grooves 38 being equal and in the same direction as the pitch of the worm threads 28. Both ends of said grooves respectively are merged into one another, whereby there is formed a single endless groove in which engages a shoe 39 carried on a shank 40 pivotally mounted in the housing 41 supported on the frame 5 and receiving said sleeve 29.

Figure 9:
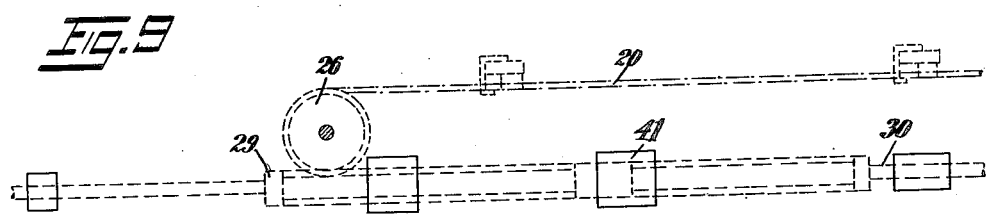

When the sleeve 29 and the shaft 30 are rotated the sleeve will be caused, by the engagement between said shoe and grooves to slide along the shaft in one direction or the other depending upon whether the shoe is in the groove 36 or 38. When the shoe comes to the end of a groove it will immediately pass into the other groove of opposite pitch and the direction of the sliding movement will be reversed. Thus, during the rotation of the shaft, the whole sleeve 29 with the worm threads 28 thereon, will not only rotate but will reciprocate upon the shaft 30 a distance equal to the length of the grooved portion of the sleeve. When the shoe is at either extreme of the spiral grooves (Figs. 7 and 9), there will, of course, be an instantaneous pause in the sliding movement of the sleeve.

Figure 8:
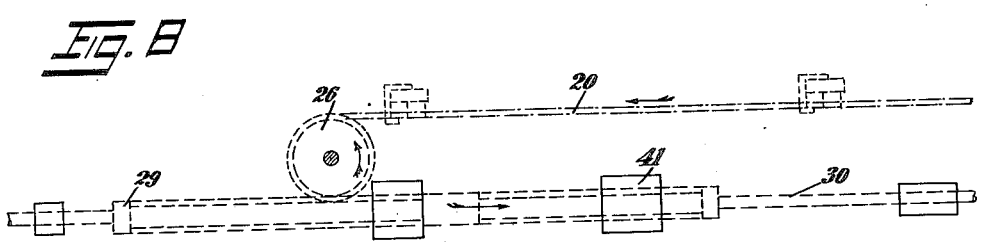

During the operation of the machine, the worm wheel 26 and the chains 20 move in the direction indicated by the upper arrows of Fig. 8. The shaft 30 rotates clockwise, looking at the same from the right end of Figs. 7 and 8. For every rotation of the shaft 30 or sleeve 29, there is a relative displacement between the worm 28 and the teeth of the wheel 26 equal to the pitch of the screw, which is also equal to the pitch of the groove. There is at the same time, a relative sliding movement between the sleeve and the shaft 30 equal to the pitch of the screw or groove. Therefore, when the sleeve is sliding in the direction indicated by the lower arrow of Fig. 8, these movements are added and the teeth of the wheel 26 move twice the distance of the pitch of the screw for each rotation of the sleeve.

Figure 10:
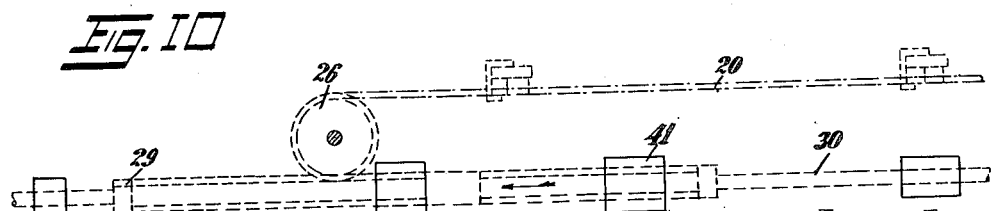

On the other hand, when the sleeve slides in the direction of the arrow in Fig. 10 the distance of the pitch of the groove, for each rotation of the sleeve the teeth of the wheel 26 move relatively to the worm in the opposite direction the same distance, and the two movements neutralize each other so that there is no actual movement of the worm wheel 26 at all.

Consequently while the shaft 30 continuously rotates, there is an intermittent movement of the wheel 26 and the chains 20, the chain conveyer being maintained at a dead stop between each movement a length of time equal to the time of such movement.

In order to hold the shoe 39 steady, while in the intermediate part of the groove, a spring plate 42 is fixed to the shank 40 and is provided with a small projection 44 adapted to snap into engagement with one of the small notches 45 in the notched plate 46 secured to the housing 41. This engagement takes place at either limit of movement of the shoe.

Now will be described the means for feeding the envelops to the chain conveyer.

The envelops 50 are piled in the envelop magazine, in slanting position (Figs. 1 and 2), with their lower ends resting upon the floor thereof which is bent downwardly as at 51 in order to hold the envelops at the most desirable angle, though it is understood that the whole magazine could be inclined at a different angle if thought desirable. The forward part of the lowest envelop rests on the anti-friction supporting disks 52 (Figs. 11 and 13), loosely carried on the picker shaft 54. On the shaft 54 are also carried the picker wheels 55 each carrying a pair of picker pins 56 adapted when the picker wheel is rotated to engage and move the lowest envelop forwardly to the milled take-off rollers 57 carried on the take-off shafts 58 and 59 connected by intermeshing gears 60.

It is noted that the inner ends of the envelops are supported by the inclined floor of the magazine, and that the outer end of the lowermost envelop is supported by said disks. The middle of the lowest envelop is left unsupported, and in this way a minimum of resistance is encountered in pulling the envelops out.

Above the outer ends of the several lowermost envelops, there is provided a yieldable friction block 53 of soft rubber or the like, to which the ends of the envelops are guided by the guiding strip 63.

This friction block serves to hold back the next to the lowest envelop, since it offers more resistance to the next to the lowest envelop, for holding this envelop in place, than the lowest envelop exerts upon the next to the lowest to pull it out. On the other hand, the picker pins 56 exert more pulling resistance on the lowest envelop, than the friction block exerts restraining resistance.

The end of the shaft 54 is driven by the inclined shaft 61 to which it is connected by beveled gears 62. The shaft 61 is driven by the cam shaft 64 (Fig. 2), to which it is connected by the universal connection 65; and the cam shaft 64 is driven by the transverse shaft 66 (Fig. 3), which is in turn driven from the main drive shaft 30 by means of the reducing gear 68.

The shaft 59 is driven from and connected, by means of gears 69, to the vertical shaft 70. The vertical shaft 70 is provided at its lower end with a gear 71 engaged by double beveled gear 72 carried on the horizontal shaft 74.

The horizontal shaft 74 is driven from the inserting feed roller shaft 75 by means of the spur gears 76 (Figs. 3 and 17). The shaft 75 is driven by means of the chain of gearing 78 from the connecting shaft 79 which is in turn driven from a transverse shaft 80 connected thereto by means of bevel gears 81 and 82. The transverse shaft 80 is driven from a vertical shaft 84 by means of bevel gears 85, said vertical shaft 84 being driven from the main drive shaft 30 by means of bevel gears 86.

When the envelops are fed through the take-off rollers 57 they are deflected downwardly by the deflector 88 (Fig. 11), onto the reciprocating plate 89 of the timer or precisionizer 10, whence they are carried, by means of the movement of said plate 89, between the lower feed rollers 90 carried on the upper shaft 91 and the lower shafts 92 and 93, the latter of which is provided with a bevel gear 95 intermeshing with the bevel gear 72, whereby said feed rollers 90 are driven from the horizontal shafts 74.

The reciprocating plate 89 is provided at its rear end with an upstanding pusher 96, whereby the envelops are constrained to move between the side walls 94 of the precisionizer and under the shield 97 to the rollers 90 as the plate is reciprocated. The reciprocating plate 89 is guided upon the floor 98 of the precisionizer and is reciprocated by means of a lever 99 fulcrumed as at 100 upon the floor of the precisionizer and provided at its inner end with a slot 101 receiving the screw 102 carried by the reciprocating plate. The outer end of the lever 99 is connected by means of a link 104 to one arm of a bell crank lever 105 fulcrumed upon a bracket 106 carried on the frame 5. The outer arm of the bell crank lever is provided with an antifriction roller 108 engaging a cam 109 carried on the cam shaft 64; said roller is held in engagement with the cam and the reciprocating plate yieldably moved toward its outer position by means of a spring 110 tensioned between pins carried on the link 104 and the frame 5. By the means just described, it is obvious that the plate 89 is reciprocated as the shaft 64 rotates.

If desired, the timer 10 and the feed rollers 90 may be omitted entirely, and the envelops fed directly from the take-off rollers 57 onto the conveyer in which case the magazine 8 will be reversed.

From the feed rollers 90 envelops are fed to the chain conveyer 6. Now will be described the means carried by the chain conveyer for conveying the envelops from the feeding means to the various mechanisms. At equal intervals upon the chains 20 there are provided brackets 120 (Figs. 11 and 27), each provided with a downwardly turned end piece 121 secured to said chains respectively and forming a part of a link thereof. Upon the bracket 120 is secured a cross-piece 122 provided at its end with angular grooves 124 engaging the edges of the front and rear guide plates 126 and 128 carried on the frame of the machine. Beneath the chains 120 are provided supporting tracks 129 holding the upper part of the chains in alinement and said cross-pieces against said guides. Extending from the forward edge of the cross-piece 122 is a pair of lugs 130 between which are pivotally mounted on the rod 131, a pivoted dog 132 provided at its upper part with a clip 134 adapted to be pressed against a strip of friction material 135 secured upon the top face of the cross piece 132. This clip is held in yieldable engagement with said friction material by means of a coil spring 136 engaging under the cross-piece 132 and against the tail 138 forming the lower part of said dog. At appropriate times, appropriate means engage this tail to hold said clip out of engagement with the friction material.

The clips just described are so disposed and the periods of rest and motion of the chain are so regulated, that said clips are brought to rest just beyond the inserting mechanisms and the flap-tucking mechanism and just over the edge of the cam abutment 140 placed between the tracks 129 between the precisionizer and the flap-opening device as shown in Fig. 11. The envelop picker wheel and the precisionizer are so timed that an envelop is fed with its forward end under the clip 134 just as this clip is about to advance from over the abutment 140 as shown in Fig. 11. When the chain is again advanced, the tail 138 slips off from the edge of the abutment 140, and the clip, under the action of the spring 136, clamps the end of the envelop to the cross-piece 122 and the envelop is carried to the flap-opening device 11, shown in detail in Figs. 14 to 16.

The envelop moves toward the flap-opening device with the flap 139 over the rear guide plate 128 and disposed upwardly when it reaches the flap-opening device, the envelop passes under the curved end 149 of the opening blade 141 secured by means of bolts 142 and 144 to brackets 145 and 146 mounted in the frame 5. The bracket 145 has its upper part disposed well above the opening plate 141 to give plenty of room for the passage thereunder of the flap of the envelop.

As the envelop passes under the opening plate 141, the envelop is pressed upwardly against the opening plate by means of the flat spring 148, so that the beveled opening edge 149 may surely engage under the flap. As the envelop continues to move along the opening device, the partially opened flap engages the opening spiral 150 which moves the flap backwardly and downwardly; thereupon the flap passes the free rear end 152 of the spiral and is then pointing directly downwardly, in which position it reaches the circular-inserting mechanism. The forward end of the spiral is fixed to the forward end 149 of the opening blade.

As the envelop reaches the circular-inserting mechanism, the open side of the envelop rests upon the rear guide plate 128 while the closed edge is disposed on the front guide plate 126 against the guide face 153 of the upper guide 154 (Fig. 23). The flap of the envelop is disposed in the flap guide 155 secured to a bracket 156 secured to the under face of the rear guide plate 128.

The period of movement of the chain conveyer is so timed that the envelop is brought to rest just in front of the inserting rolls 158 and 157, the latter mounted on the shaft 75, while the rolls 158 are mounted on the short shaft 160 geared to the shaft 75 by means of gears 161. The shafts 75 and 160 are mounted in bearing blocks 164 and 165 respectively, the latter being mounted upon and spring pressed toward the blocks 164, the blocks 164 being mounted upon the main frame.

The circulars are passed between the rolls 158 and 159 into the envelop, and means are provided for holding the mouth of the envelop open for the reception of the circulars. This means will now be described.

Near and in front of the rolls 158 and 159 are disposed a pair of opening fingers 170 (Figs. 17 and 23), pivotally mounted on small supports 171 fixed on the finger supporting shaft 172. These fingers are yieldably held in position by means of flat springs 174 screw clamped to the front face of the blocks and engaging in slots on the fingers. These fingers are adapted to swing forwardly and engage in the mouth of the envelop, whereupon the fingers continue to move upwardly and open the mouth of the envelop. The finger supporting shaft is journaled in brackets 176 carried on the machine.

The means for oscillating the finger supporting shaft will be described presently.

To the rear of the receiving rollers 158, 159, is disposed a receiving plate 178 carried upon a lower plate 179 and a bracket 180, carried upon the main frame 5. Said lower plate 179 is mounted in grooves 181 in said brackets 180.

Slidable in said grooves 181 is the reciprocating plate 183 provided on its lower face with a bracket ear 184 connected by means of the link 185, to an actuating arm 186 mounted on the rocking crank shaft 188, and held yieldably pressed backward by means of a spring 189. The crank shaft 188, is oscillated by means of a crank arm 190 (Fig. 24), fixed thereon and adapted to be engaged by a sector cam 192 carried on the cam shaft 64. The said sector cam 192 is so positioned and timed that it causes the reciprocating plate 183 to be moved forwardly once each time an envelop is stopped in front of the inserting rollers and at the same time that the inserting fingers 170 open the envelop.

Mounted upon the rear part of the reciprocating plate 183 (Fig. 23) is a standard 194 which extends forwardly slightly spaced from the reciprocating plate and is provided at its inner end with an upstanding inner portion 195, to which is secured an upright follower 196 on the rear face of which is secured a spring 198 provided at its lower end with a roller 199 adapted to engage the rear face of a holding strip 200 pivoted on the rear edge of the receiving plate 178, and provided with a rear extension face 201 also adapted to be engaged by said roller.

When said reciprocating plate moves forwardly, said roller 199 is also carried forwardly and causes said holding strip 200 to move downwardly toward the receiving plate 178 for holding the circulars in position when they are moved forwardly by the follower. When the reciprocating plate is retracted, said roller 199 engages the face 201 and causes the holding strip to be raised to upright position.

The magazines for holding the circulars and the associated feeding means are almost identical with the means for feeding the envelops and need now be only described briefly.

The circular magazines (Fig. 2) are disposed at opposite ends of the receiving plate 178, and are mounted at their lower ends upon the brackets 180, and are upheld at their upper parts by means of braces 204 secured to the frame of the machine.

The circular feeding means are each provided with a pair of supporting disks 205 (Fig. 24), mounted upon the picker shaft 206 rotatably mounted in brackets 208 carried upon the receiving plate 178. Said picker shaft is rotated by means of beveled gears 209 to which power is received from the gear shaft 210 which receives its rotation from a short shaft 211 (Fig. 3) driven from the cam shaft 64. On said picker shaft 206 are also carried the picker wheels 212 provided with picker pins similar to the ones described in connection with the envelop feeding means, adapted to pull off the lowermost circular from the magazine and feed it to the take-off rollers 213 (Fig. 24), carried on shafts 214 intergeared by means of spur gears 215, driven by means of beveled gears 216 from the shaft 79. The circulars are deflected from the take-off rollers 213 onto the receiving plate 178 by means of deflectors 217.

Sometimes it is desirable to hold the circulars out of operative relation with the picker pins to prevent the feeding of the circulars. To this end there are provided holding fingers 218 (Fig. 2), adapted to engage under the lowermost cards and fixed on small shafts 219 journaled in the magazines 14 and 15, the shafts being respectively provided with end cranks connected by a link 219′ for simultaneous movement.

The take-off shafts 214 are carried by the brackets 208 (Figs. 24 and 2), and it is noted that the upper part of said brackets are inclinded relative to the receiving plate 178 at different angles, as best shown in Fig. 2, so that the circulars are fed to the receiving plate one above the other and are then pushed into the inserting rollers as has been explained. While the circular magazines 14 and 15 are shown at opposite ends of the receiving plate, the invention is not limited to this arrangement, since one or any convenient number of magazines may be used and these may be side by side or one above the other or in stepped relation.

Disposed transversely of the main frame and under the front and rear guide plates and the receiving plate 178 is an oscillatory shaft 221 on which is fixed a precisionizer 222 (Fig. 19), passing through an opening 224 near the end of the receiving plate 178 opposite to a positioning stop 225 at the opposite end of the receiving plate. Said precisionizer and stop serve for positioning the circulars 226 one above the other before they are fed to the inserting rollers. Said oscillatory shaft 221 receives its motion through an arm 227 to which is pivotally connected a sliding bar 228 on the front of the main frame, and guided by means of a screw bolt 229 engaging in a slot 230. Said bar is provided with an upturned end 232 having an engaging face 233 engaged by a cam 234 carried on the shaft 66. Said bar is held in engagement with said cam 234 by means of a tension spring 236 tensioned between the inner end of the bar and a bolt 237 carried on the frame of the machine. It will, therefore, be seen that the precisionizer 222 is rocked once for every rotation of the shaft 66. The upper end of the precisionizer is connected by means of a link 238 with an arm 240 carried on a short shaft 241, having geared connection with the finger supporting shaft 172. There is also mounted upon an oscillatory shaft 221, a tail engaging arm 242 adapted to engage the tail 138 of the dog which has just brought an envelop to the position of rest in front of the inserting rollers. It will, therefore, be seen that for each oscillation of the oscillatory shaft the inserting fingers 170 and the precisionizer 222, are operated and at the same time the clip 132 is opened. An additional spring 243 strained between the link 238 and a pin 244 on the plate 264 to be described. Contact of the arm 242 with a cross piece 247 of the main frame limits backward movement of said arm and the precisionizer.

At this instant the follower 196 comes forward and causes the feeding of circulars into the envelope, said clips 132 being released for the easy insertion of the circulars. In order that the inserting fingers 170 may not lift up the envelop when they are opening the mouth thereof, means are provided for engaging the flap of the envelop to draw the same downwardly to prevent the raising of the envelops. These means will now be described.

Passing through an opening 245 in the rear part of the main frame 5 (Fig. 23), is a thumb rod 246 provided at its inner end with a compressible thumb piece 248, the rear end of said rod being pivotally connected to the wiping lever 249, fulcrumed beneath the plate 179, and provided with a curved lower end 250 adapted to be engaged by a cam 251 carried on the cam shaft 64. Said shaft is yieldably held in its rearmost position of movement by means of the coil spring 252, and is carried forwardly by means of said cam 251 and said lever 249, until said thumb engages an envelop flap disposed against the upper face 254 of said flap guide 155, whereupon, on the continued movement of said lever 249 said rod 246 moves longitudinally forwardly and also pivotally in the opening 245, whereby the compressible thumb not only holds the flap against the face 254 but draws the flap downwardly. This action takes place while the fingers 170 are opening the mouth of the envelop and prevents the lifting of the envelop by said fingers, and permits the easy insertion of the circulars into the envelope.

After the circulars have been inserted into the envelop, backward oscillation of the oscillating shaft 221 (Fig. 19), and the tail engaging arm 242 permits the clip 132 to again engage the envelop, and at the next period of motion the filled envelop is brought to a position of rest in front of the tucking mechanism 18 (Figs. 25 to 27).

The flap tucking mechanism comprises a rocking shaft 260 intermediately offset as at 261, and mounted for rocking movement in a pair of brackets 262 carried upon a plate 264 (Fig. 25), mounted upon brackets 265, carried upon the rear part of the main frame 5, said brackets aiding in the support of the cam shaft 64 and the crank shaft 188, previously described.

Upon the crank shaft 188 there is loosely mounted an actuating arm 268 provided with a roller 269 engaged by a cam 270 on the cam shaft 64. The upper part of the actuating arm 268 is connected by means of an elbow link 271 with a short crank 272, fixed on the end of the rocking shaft 260 whereby said shaft is rocked from said cam 270. Near opposite ends of the rocking shaft are mounted lifting fingers 274, adapted to engage in and open the mouth of an envelop 275 (Fig. 27), said fingers being held in retracted position by means of a tension spring 276 strained between an arm 278 on the rocking shaft, and a pin 279 on said plate 264. Just to the rear of and below the rear guide plate 128 there is mounted in small bearing brackets 279 a small spindle 280 on which is carried an intermediately pointed tucker frame 281 and an end pinion 282, the latter being engaged by a rack 284 having its rear end pivoted as at 285 to said actuating arm 268 and its forward end provided with a slot 286 engaging a roller 288 for guiding said rack in meshing relation with the pinion. When the fingers 274 are fully retracted by the spring 276, the frame 281 is in its lowermost position and engages the outer face of the envelop flap which is about to be tucked, whereupon the rotation of the cam 270 causes the fingers 274 to engage in and open the mouth of the envelope as shown in Fig.

27, the frame 281 at the same time being revolved and bringing the flap into tucked position within the envelop.

In order to prevent the tip of the flap catching against the mouth of the envelop, we provide a flexible tongue 290 (Fig. 25), which engages and slightly bends back said tip as the flap is being tucked in. After the flap has been tucked in, the fingers 274 and the frame 281 resume their normal position under the action of the spring 276 and the envelop is carried by the clip until the tail 138 engages the discharge cam 292 (Fig. 25), thus releasing the envelop and discharging it from the machine.

The operation of the machine will be readily understood from the foregoing and need now be only briefly summarized as follows:

The magazine 8 is filled with envelops and the magazines 15 and 16 with circulars ready for insertion in the envelops. The envelops are fed one by one from the magazine into the clip which has been brought to rest above and opened by the abutment block 140 (Fig. 11), whereupon said clip moves away from said abutment and clamps the end of the envelop upon the cross-piece, carrying the envelop by the flap opening blade and spiral (Fig. 15), which bends back the flap by the time the envelop is brought to rest in front of the inserting rollers.

When the envelope is thus brought to rest the circulars are fed from their magazines to superposed position upon the receiving plate 178 (Fig. 23), from which position they are pushed by the follower into the inserting rollers 158 and 159 and are by said rollers projected into the envelope, which has been in the meantime opened by the coöperation of the inserting fingers 170 and the compressible thumb.

The next period of movement of the conveyer carries the envelop opposite the flap tucking mechanism 18 in which position the lifting fingers 274 open the mouth of the envelop, and the tucking frame tucks the flap into the envelop, after which the envelop is discharged from the machine.

We claim as our invention:

1. In a machine for filling and closing envelops, the combination of, an envelop feeding means; a flap opening means; a means for inserting articles into the envelops; a means for tucking the flap into the envelop; and a conveyer for conveying envelops from the feeding means to the flap opening means, thence to the inserting means, and thence to the flap tucking means.

2. In a machine for filling and closing envelops, the combination of, a conveyer; means for feeding envelops to the conveyer; a flap opening means to which the envelop is carried by the conveyer; means for inserting articles into the envelops as the latter are carried past by the conveyer; and means to which the envelop is carried by the conveyer for tucking the flap into the envelop.

3. In a machine of the character described, the combination of, a conveyer; clips on the conveyer; means for momentarily opening the clips of the conveyer; means for feeding envelops to the clips when thus opened; and means for inserting articles into the envelop.

4. In a machine of the character described, the combination of, a conveyer; a plurality of clips disposed thereon; means for imparting intermittent motion to said conveyer; means for opening said clips during a period of rest; means for feeding envelops to the clips while thus opened; and means for opening the flaps of the envelops and inserting matter thereinto.

5. In a machine for inserting articles into envelops, the combination of, a chain conveyer; a plurality of pieces disposed at intervals along said conveyer; clips mounted on said pieces; means for imparting to said conveyer an intermittent motion whereby said clips are brought to rest at a plurality of positions; means for momentarily opening said clip at one of said positions; means for feeding envelops to said clips while thus opened; means for opening the flap of the envelop as the envelop is moved from said postion; and means for inserting articles into the envelop when moved to another position.

6. In a machine for inserting articles into envelops, the combination of, a chain conveyer; a plurality of pieces disposed at intervals along said conveyer; clips mounted on said pieces; means for imparting to said conveyer an intermittent motion whereby said clips are brought to rest at a plurality of positions; means for momentarily opening said clip at one of said positions; means for feeding envelops to said clips while thus opened; means for opening the flap of the envelop as the envelop is moved from said position; means for inserting articles into the envelop when moved to another position; and means for closing the flap of the envelop at still another position.

7. In a machine for filling and closing envelops, the combination of, a main frame; sprockets mounted on said main frame; a chain conveyer on said sprockets; means for imparting intermittent motion to said chain for providing periods of motion and periods and stations of rest therebetween for envelops carried by the conveyer; cross-pieces secured at intervals along said conveyer; clips pivoted on said cross-pieces; means for opening said clips during a period of rest near the receiving end of the machine; means for feeding an envelop to said clips; means for opening the flap of the envelop as the envelop is carried from one station of rest to the intermediate station of rest; means for inserting matter into the envelop when said envelop is at said intermediate station of rest; and means for tucking in the flap of the envelop after the envelop has been moved from said intermediate station of rest to another station of rest.

8. In a machine for filling and closing envelops, the combination of, a main frame; driving and driven sprockets transversely mounted near the receiving and discharge ends of said frame; a pair of driving sprockets on each shaft; a pair of conveyer chains arranged side by side on said sprockets; cross-pieces secured at intervals along said chain; a pivoted clip mounted on each cross-piece for holding envelops thereon; means for intermittently driving said driving shaft whereby the envelops secured to said cross-pieces are given intermittent travel and brought to rest at receiving, inserting, and tucking stations disposed along said frame; means for opening the clip at the receiving station and inserting an envelop therein; means for opening and bending back the flap of the envelop as the envelop travels from the receiving station to the inserting station; means for inserting matter into the envelop at the inserting station; and means for tucking in the flap of the envelop at the tucking station.

9. In a machine for filling envelops the combination of conveying chain clips at intervals along said chain; a rear guide plate disposed along said chain; means for opening said clip and inserting the end of an envelop thereinto with the flap uppermost; an opening blade disposed solely spaced above said guide plate and provided with an opening edge adapted to engage under the flap of the envelop as the envelop is moved along by the blade; means for pressing the envelop upwardly as it reaches the blade in order that the flap may be surely engaged by the blade; an opening helix associated with the blade for opening the flap rearwardly and downwardly as the envelop passes the blade; and means for inserting matter into the envelop after the flap is thus opened.

10. In a machine for filling and closing envelops the combination of a main frame; a pair of conveyer chains arranged side by side longitudinally of said main frame; means for imparting intermittent periods of motion and rest to said chain for providing stations of rest for envelops carried upon the chain; cross pieces secured at intervals along said chains; front and rear guide plates carried on opposite sides of said pair of chains; an upper guide plate disposed slightly spaced above said front guide plate; a pivoted dog pivoted to the forward edge of each crosspiece and provided with a rearwardly extending clip; means for momentarily opening said clip during a period of rest; means for feeding envelops into the open clip with the closed side edge under said upper guide and the flap disposed upwardly over said rear guide plate; a flap opening blade disposed slightly above said rear guide plate and provided with an opening edge adapted to engage under the flap of the envelop as the envelop is moved after said period of rest; a blade supporting bracket secured to said main frame for supporting said blade in position, an intermediate part of said bracket being remote from said blade in order not to interfere with the opening of the flap; a flat spring on said rear guide for pressing envelops upwardly before it reaches the blade; an opening helix secured to the upper face of the receiving end of the blade and spiraling rearwardly and downwardlly beneath said guide plate to the discharge end of the blade; and means for inserting matter into the envelop after the flap has been opened.

11. In a machine for filling and closing envelops, the combination of, conveyer chains arranged side by side; means for imparting to said chain intermittent periods of motion; cross-pieces secured to said chains and provided with end grooves; front and rear guide plates carried on said main shaft and engaging in said grooves; a pivoted dog pivoted to the forward edge of each of said cross-pieces and each provided with a downwardly extending tail and a backwardly turned clip adapted to engage over the top of the cross-piece; a stationary cam abutment near the receiving end of the main frame and adapted to engage said tail; means for feeding envelops to said clips with the flap upwardly disposed over said rear guide plate; a flap opening blade disposed slightly spaced above said rear guide plate and provided with an opening edge adapted to engage under the flap of the envelop as the envelop is carried by the chains away from said cam abutment; a blade supporting bracket secured to said main frame for supporting said blade in position, the intermediate part of said bracket being remote from said blade, in order not to interfere with the opening of the flap; a flat spring on said rear guide plate for pressing the envelop upwardly before it reaches the blade in order that the flap may be surely engaged by the blade; an opening helix secured to the upper face of the receiving end of the blade and spiraling rearwardly and downwardly beneath said rear guide plate of the discharge end of the blade; a flap guide fixed to the lower part of the guide plate for holding the flap open, as it is discharged from the opening spiral; and means opposite said flap guide for opening the envelops and inserting matter thereinto.

12. In a machine for inserting articles into envelops, the combination of a plurality of magazines, a receiving platform for receiving articles from said magazines, an envelop support; and means for simultaneously feeding the articles from said receiving platform into the same envelop.

13. In a machine for inserting articles into envelops, the combination of, a plurality of magazines; an envelop supporting means; and means for simultaneously feeding articles from said magazines into the same envelop.

14. In a machine for inserting articles into envelops, the combination of, envelop supporting means; a plurality of magazines; and means for feeding articles from the separate magazines, superposing them and inserting them into the envelop.

15. In a machine for inserting matter into envelops, the combination of, a pair of inserting rollers; means for placing envelops opposite the inserting rollers; separate magazines for holding different kinds of pieces of matter to be inserted; feeding means for superposing pieces from the respective magazines and feeding them thus superposed to the inserting rollers; means for opening the mouth of the envelop and a means for simultaneously drawing back the flap of the envelop as the superposed pieces are discharged from the inserting rollers into the envelop.

16. In a machine for inserting matter into envelops, the combination of, means for holding envelops in inserting position with the mouths thereof held open; a pair of separate magazines; and means for feeding pieces of matter from the respective magazines and superposing them and inserting them into the envelop.

17. In a machine for inserting matter into envelops, the combination of, a pair of inserting rollers; an intermittently driven conveyer provided with envelop holding means for receiving envelops and bringing them with the flaps open, to a position opposite the inserting rollers; a receiving plate for receiving superposed pieces of matter for insertion into the inserting rollers; means for feeding the pieces of matter one above the other on to said receiving plate; means for pushing the superposed pieces into the inserting rollers for insertion by the rollers into the envelops; means engaging in the mouth of the envelop for opening the same to receive the pieces from the rollers; friction means for engaging and drawing back the flap of the envelop as the mouth is being opened; and means for releasing the envelop holding means as the pieces are inserted into the envelop.

18. In a machine for inserting matter into envelops, the combination of, a pair of inserting rollers; an intermittently driven conveyer provided with clips for receiving envelops and bringing them to a position in front of said inserting rollers with the flap open; a receiving plate behind said inserting rollers; a positioning stop at one end of the receiving plate; means for feeding circulars one above the other to said receiving plate; a follower for pushing the superposed circulars into said inserting rollers; a holding strip for holding down the circulars as they are thus pushed; opening fingers for opening the mouth of the envelop as circulars are fed from the inserting rollers into envelops; a precisionizer for positioning the superposed circulars against said stop before they are fed into the rollers; and means engaging said clips for releasing the envelops as the circulars are fed thereinto.

19. In a machine for inserting matter into envelops, the combination of, a conveyer provided with cross-pieces at intervals thereon; a pivoted dog on each cross-piece provided with a clip and a tail; means for imparting intermittent motion to said conveyer whereby positions of rest are provided; means for opening the clips and feeding envelops thereto; means for opening the flap of the envelop rearwardly and downwardly, as the envelop is conveyed to a position of rest; a pair of inserting rollers disposed to the rear of said position of rest; a receiving plate to the rear of said rollers; means for feeding circulars one above the other to said receiving plate; a holding strip for holding said circulars down upon the receiving plate; a finger supporting shaft in front of said rollers and above the mouth of the envelop provided with fingers for engaging in the mouth of the envelop to open the same; means engaging said tail for opening the clip as said fingers open the mouth; a compressible thumb for engaging and drawing down said flap as the mouth is opened; means for positionizing the circulars one above the other as said mouth is opened; and a follower for pushing said circulars into the inserting rollers for feeding them into the envelop.

20. In a machine for inserting articles into envelops, the combination of, a receiving means; an envelop support; means for conveying articles from the receiving means into envelops; a pair of magazines; a pair of take off rollers associated with each magazine and said receiving means, each pair of rollers having a different angular relation to the receiving means; a picker for picking articles from the magazine and conveying them to the receiving rollers; a device for rendering the picker inoperative; and means for simultaneously operating devices.

21. In a machine for inserting articles into envelops, the combination of, a receiving means; means for conveying articles from the receiving means and inserting them into envelops; a pair of magazines; and take off means associated with each magazine and the receiving means, the take off means of the magazines discharging articles above and into the receiving means at different heights.

22. In a machine of the character described, the combination of, an envelop support; means for feeding envelops with the flaps open one by one to the support; and means pivotally mounted on an axis parallel and adjacent to the hinge portion of the envelop flap for engaging the flap and tucking it into the envelop.

23. In a machine of the character described, the combination of, an envelop support; and means pivotally mounted on an axis parallel and adjacent to the hinge portion of the envelop flap for engaging the flap of the envelop and tucking it into the envelop.

24. In a machine for closing envelops, the combination of, means for supporting an envelop with its flap opened; means adjacent to the mouth of the envelop and provided with lifting fingers for engaging in and opening the mouth; and a spindle parallel and adjacent to the hinge portion of the envelop flap and provided with a frame pivotally mounted thereon adapted to engage the outer face of the envelop and tuck the same into the mouth when the latter is opened by the lifting fingers.

25. In a machine for closing envelops, the combination of, means for supporting an envelop with its flap opened; means adjacent to the mouth of the envelop and provided with lifting fingers for engaging in and opening the mouth; a spindle near said mouth and provided with a frame adapted to engage the outer face of the envelop and tuck the same into the mouth when the latter is opened by the lifting fingers, and a flexible tongue for bending back the tip of the flap when the latter is tucked in by said frame.

26. In a machine for closing envelops, the combination of, a conveyer adapted to bring the envelops to a station of rest with the flap opened downwardly; a rocking shaft disposed above the open mouth of the envelop and provided with a flexible tongue at its middle part and lifting fingers on respectively opposite sides of the flexible tongue; a spindle below the mouth of the envelop; a tucker frame carried on said spindle and adapted to engage the flap and move it into the envelop when the mouth of the envelop is opened by the lifting fingers; said flexible tongue serving for bending back the tip of the flap when the latter is tucked in by the tucker frame; a pinion on the end of said spindle; a rack meshing with the pinion; and means for moving said rack and rocking said shaft simultaneously.

27. In a machine for closing envelops, the combination of, a main frame; a conveyer disposed along the main frame; means for causing said conveyer to convey envelops with intermittent periods of rest and travel with the flaps at the side and uppermost; means for opening the flap rearwardly and downwardly; means for inserting matter into the envelop during a period of rest; an intermediately upset rocking shaft disposed opposite the open side of the envelop at the point of the next period of rest after the matter is inserted; an oscillatory lever arm; a crank on the rocking shaft; a link connecting said lever arm to said crank; a pair of lifting fingers on said rocking shaft; a spindle beneath said rocking shaft beneath the mouth of said envelop; an intermediately pointed tucker frame on said spindle for bringing the envelop flap upwardly and forwardly when the mouth of the envelop is opened by the lifting fingers; a flexible tongue secured on the upset part of the rocking shaft for bending back the tip of the flap when the latter is tucked in by the tucker frame; a pinion on the end of said spindle: a rack meshing with said pinion and pivoted to said lever arm; and means for discharging the envelop from the conveyer after the flap has been tucked in.

28. In a machine for opening and closing envelops the combination of a main frame; a pair of conveyer chains disposed side by side longitudinally of said main frame; means for imparting to said chain intermittent periods of motion and rest; crosspieces secured at intervals along said chains; a rear guide plate to the rear of said crosspieces; pivoted dogs provided with clamping clips on said cross pieces; means for opening said clip and inserting an envelop thereinto with the flap to the rear of the machine and uppermost; means for opening the flap rearwardly and downwardly; means for inserting circulars into said envelop during a period of rest; an intermediately upset rocking shaft disposed to the rear of said guide plate opposite the next station of rest after the envelop has passed from the circular inserting means; a crank shaft; a lever arm fixed on said crank shaft opposite said rocking shaft; a crank on the rocking shaft; an elbow link connecting said lever arm to said last named crank; a pair of lifting fingers on said rocking shaft; a tucker supporting spindle rotatably mounted to the rear of said guide plate beneath said rocking plate; an intermediately pointed tucker frame on said spindle for bringing the envelop flap upwardly and forwardly when the mouth of the envelop is opened by the lifting fingers; a flexible tongue secured on the upset part of the rocking shaft for bending back the tip of the flap when the latter is tucked in by the tucker frame; a pinion on the end of said spindle; a rack meshing with said pinion and pivoted to said lever arm whereby the tucker frame is operated simultaneously with the lifting fingers; and means for discharging the envelop from the conveyer chains after the flap has been tucked in.

HAROLD D. PENNEY.
CHARLES E. WHITEMAN.
GEORGE F. RUSS.

Witnesses:
 GEORGE J. BARTELS,
 H. M. KILPATRICK.